United States Patent
Miwa et al.

(10) Patent No.: US 11,308,713 B2
(45) Date of Patent: Apr. 19, 2022

(54) INFORMATION PROCESSING APPARATUS, NON-TRANSITORY COMPUTER-READABLE MEDIUM, AND CONTROL METHOD FOR PROVIDING SIGHTSEEING INFORMATION

(71) Applicant: TOYOTA JIDOSHA KABUSHIKI KAISHA, Toyota (JP)

(72) Inventors: Kohei Miwa, Suntoh-gun (JP); Yuko Mizuno, Nagoya (JP); Hirotaka Omisha, Nisshin (JP); Tsuyoshi Okada, Nagoya (JP); Hiromitsu Fujii, Kariya (JP); Shinsuke Ariga, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/061,436

(22) Filed: Oct. 1, 2020

(65) Prior Publication Data
US 2021/0117646 A1    Apr. 22, 2021

(30) Foreign Application Priority Data
Oct. 18, 2019   (JP) .............................. JP2019-191190

(51) Int. Cl.
| | | |
|---|---|---|
| *G06K 9/00* | (2022.01) |
| *H04W 4/021* | (2018.01) |
| *G06V 20/13* | (2022.01) |
| *G06V 20/52* | (2022.01) |
| *G06V 40/20* | (2022.01) |
| *G06V 40/16* | (2022.01) |

(52) U.S. Cl.
CPC .............. *G06V 20/13* (2022.01); *G06V 20/53* (2022.01); *G06V 40/176* (2022.01); *G06V 40/20* (2022.01); *H04W 4/021* (2013.01)

(58) Field of Classification Search
CPC ............. G06K 9/0063; G06K 9/00315; G06K 9/00335; G06K 9/00778; G06K 9/00302; G06K 9/00637; G06K 9/00671; H04W 4/021; H04W 4/40; H04L 67/12
See application file for complete search history.

(56) References Cited

U.S. PATENT DOCUMENTS

| | | | |
|---|---|---|---|
| 2002/0135515 A1* | 9/2002 | Rankin ................. | H04W 4/021 342/385 |
| 2008/0037841 A1* | 2/2008 | Ogawa ............... | H04N 5/23218 382/118 |
| 2012/0092373 A1* | 4/2012 | Ryu ....................... | G06T 19/006 345/633 |
| 2013/0268306 A1* | 10/2013 | Tai ........................ | G06Q 10/025 705/6 |
| 2013/0346016 A1* | 12/2013 | Suzuki ................ | G06F 16/9537 702/141 |
| 2014/0303885 A1* | 10/2014 | Kamada ............. | G01C 21/3461 701/400 |

(Continued)

FOREIGN PATENT DOCUMENTS

JP    2018-012477 A    1/2018

*Primary Examiner* — Ming Y Hon
(74) *Attorney, Agent, or Firm* — Oliff PLC

(57) ABSTRACT

An information processing apparatus includes a controller. The information processing apparatus is capable of following a user. The controller acquires position information, and provides, to the user, sightseeing information according to a sightseeing spot determined from the position information.

14 Claims, 7 Drawing Sheets

(56) References Cited

U.S. PATENT DOCUMENTS

| | | | |
|---|---|---|---|
| 2015/0040004 A1* | 2/2015 | Ike | G06F 16/9537 |
| | | | 715/253 |
| 2015/0106628 A1* | 4/2015 | Holman | G06F 21/602 |
| | | | 713/189 |
| 2016/0065841 A1* | 3/2016 | Kuo | G06K 9/00261 |
| | | | 348/222.1 |
| 2016/0364678 A1* | 12/2016 | Cao | G06Q 10/083 |
| 2017/0046802 A1* | 2/2017 | Zhang | G06F 16/9537 |
| 2017/0311130 A1* | 10/2017 | Davidsson | G06F 16/29 |
| 2018/0082682 A1* | 3/2018 | Erickson | B64C 39/024 |
| 2018/0141658 A1* | 5/2018 | Baur | B60R 1/00 |
| 2018/0165504 A1* | 6/2018 | Kerzner | G06K 9/0063 |
| 2018/0262871 A1* | 9/2018 | Noro | H04W 4/021 |
| 2018/0350144 A1* | 12/2018 | Rathod | A63F 13/216 |
| 2019/0114899 A1* | 4/2019 | Kitada | G09G 3/003 |
| 2019/0215647 A1* | 7/2019 | Kagawa | H04W 4/029 |
| 2019/0228234 A1* | 7/2019 | Teshima | G06K 9/2081 |
| 2020/0066142 A1* | 2/2020 | Fowe | B64C 39/024 |

* cited by examiner

FIG. 5

| SIGHTSEEING SPOT | SIGHTSEEING INFORMATION | DIGEST VERSION |
|---|---|---|
| KIYOMIZU TEMPLE | D001 | AB01 |
| YASAKA SHRINE | D002 | AB02 |
| KINKAKUJI TEMPLE | D003 | AB03 |
| ARASHIYAMA | D004 | AB04 |
| ⋮ | ⋮ | ⋮ |

FIG. 6

| TIME | ACTION PLAN |
|---|---|
| 9:00 | ARRIVAL AT KYOTO STATION |
| 10:00-12:00 | SIGHTSEEING AT KIYOMIZU TEMPLE |
| 12:00-13:00 | LUNCH |
| 13:30-15:30 | SIGHTSEEING AT YASAKA SHRINE |
| ⋮ | ⋮ |

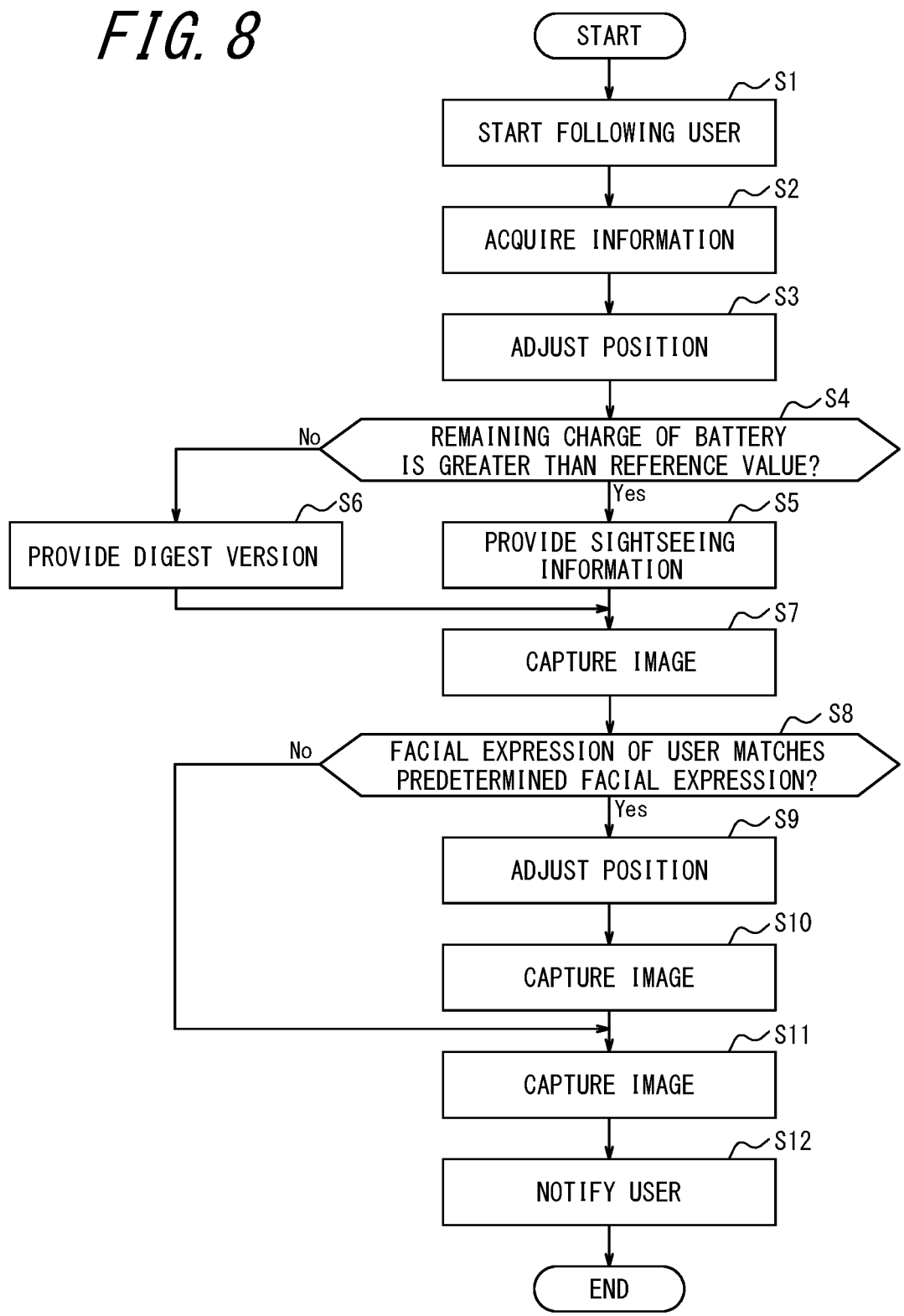

INFORMATION PROCESSING APPARATUS, NON-TRANSITORY COMPUTER-READABLE MEDIUM, AND CONTROL METHOD FOR PROVIDING SIGHTSEEING INFORMATION

CROSS-REFERENCE TO RELATED APPLICATION

This application claims priority to Japanese Patent Application No. 2019-191190 (filed on Oct. 18, 2019), the entire contents of which are incorporated herein by reference.

TECHNICAL FIELD

The present disclosure relates to an information processing apparatus, a program, and a control method.

BACKGROUND

Operation systems for achieving safe flight of a drone are known (for example, Patent Literature [PTL] 1).

CITATION LIST

Patent Literature

PTL 1: JP 2018-012477 A

SUMMARY

PTL 1 discloses how to ensure safe flight of a drone, but is silent on how to use the drone. Thus, the technical aspects of PTL 1 have room for improvement.

It would be helpful to provide an information processing apparatus, a program, and a control method, which are able to provide unmanned guidance suited to a tourist.

An information processing apparatus according to an embodiment disclosed herein includes a controller and is capable of following a user, wherein the controller is configured to:

acquire position information; and provide, to the user, sightseeing information according to a sightseeing spot determined from the position information.

A program according to an embodiment disclosed herein is configured to cause a computer, which is an information processing apparatus capable of following a user, to execute operations. The operations include: acquiring position information; and providing, to the user, sightseeing information according to a sightseeing spot determined from the position information.

A control method according to an embodiment disclosed herein is performed by an information processing apparatus capable of following a user. The control method includes:

acquiring position information; and providing, to the user, sightseeing information according to a sightseeing spot determined from the position information.

The information processing apparatus, the information processing program, and the control method according to an embodiment disclosed herein are able to provide unmanned guidance suited to a tourist.

BRIEF DESCRIPTION OF THE DRAWINGS

In the accompanying drawings:

FIG. 5 illustrates a configuration of a sightseeing information database;

FIG. 6 illustrates a configuration of a schedule database;

FIG. 8 is a flowchart illustrating an operation of the information processing apparatus.

DETAILED DESCRIPTION

Figure 1:
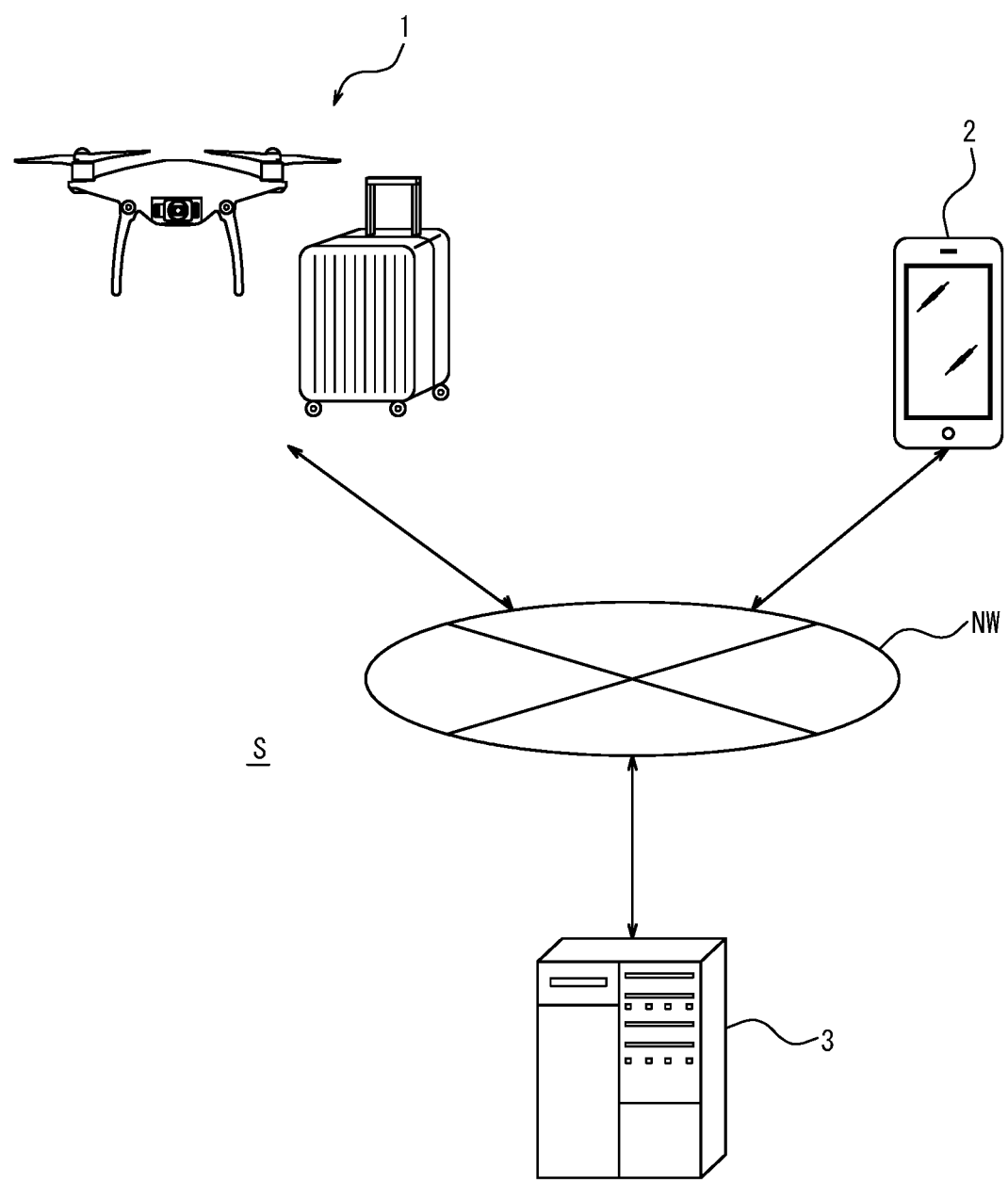
FIG. 1 is a schematic diagram of an information processing system.

FIG. 1 is a schematic diagram of an information processing system S according to an embodiment disclosed herein. The information processing system S includes an information processing apparatus 1, a terminal apparatus 2, and a server 3, which are configured to be connectable to each other. FIG. 1 illustrates one each of the information processing apparatus 1, the terminal apparatus 2, and the server 3, for convenience of explanation. However, the number of the information processing apparatuses 1, the number of the terminal apparatuses 2, and the number of the servers 3 are not limited to one. The information processing apparatus 1, the terminal apparatus 2, and the server 3 are capable of communicating with each other, for example, via a network NW which includes a mobile communication network, the Internet, and the like.

The information processing apparatus 1 is, for example, a movable apparatus configured to follow a user through program control. This configuration allows the information processing apparatus 1 to maintain a distance from the user to the information processing apparatus 1 within a predetermined value. The information processing apparatus 1 may be, for example, an unmanned aerial vehicle known as a drone, a movable suitcase, or an autonomous vehicle. The automation level is, for example, one of Level 1 to Level 5 according to the classification of the Society of Automotive Engineers (SAE).

An outline of processing that is executed the information processing apparatus 1 according to the disclosed embodiment will be described. The information processing apparatus 1 follows a user who is travelling. The information processing apparatus 1 acquires position information, and acquires sightseeing information according to a sightseeing spot determined from the position information. The sightseeing information includes, for example, a tourist attraction, a sightseeing area, a sightseeing route, or a history of the sightseeing area. The information processing apparatus 1 provides the sightseeing information acquired to the user as voice audio or images. This configuration enables the information processing apparatus 1 to provide unmanned guidance to a user who is travelling. Thus, the information processing apparatus 1 can increase the user's satisfaction with respect to travel.

Figure 2:
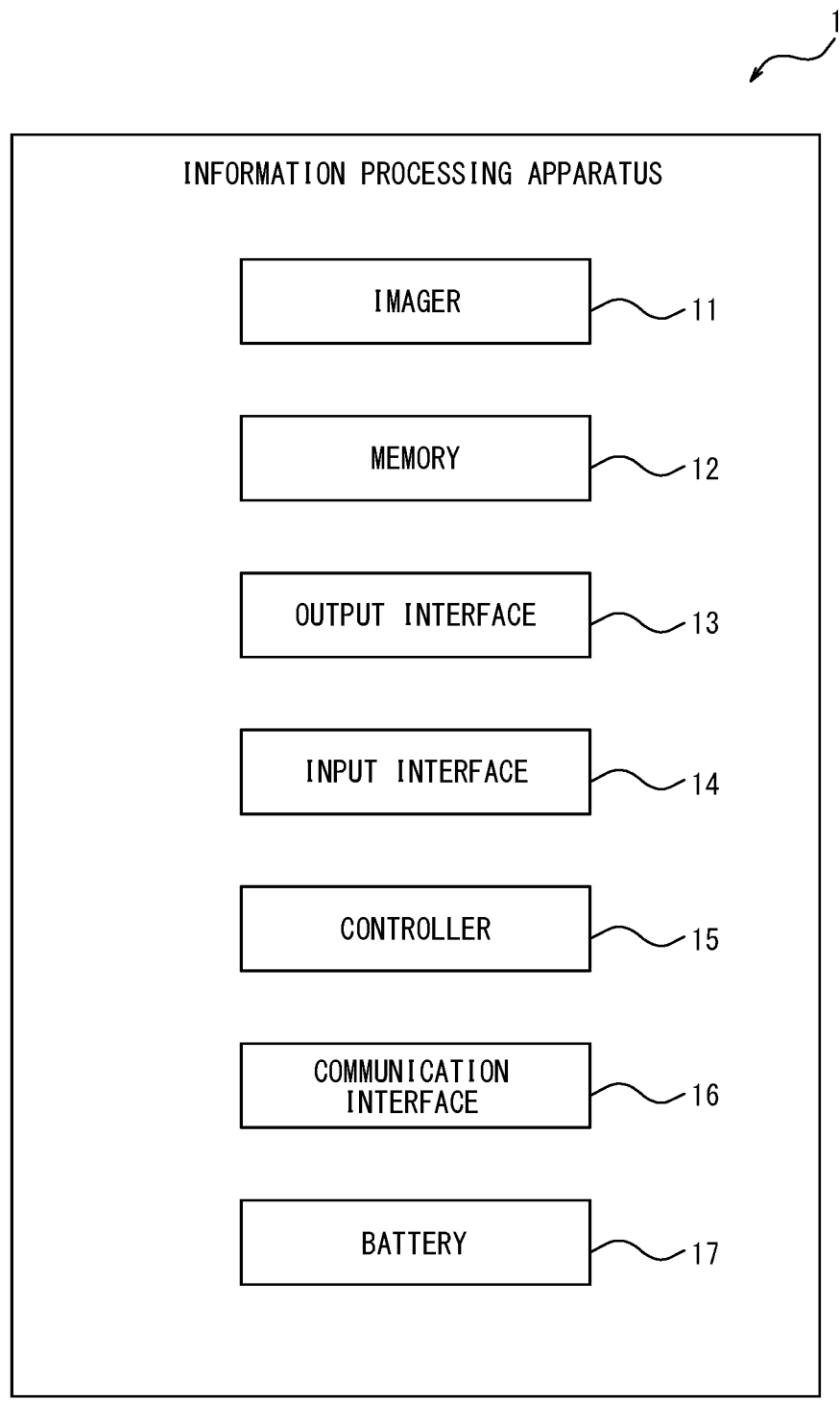
FIG. 2 is a function block diagram of the information processing apparatus.

With reference to FIG. 2, an internal configuration of the information processing apparatus 1 will be described in detail.

The information processing apparatus 1 includes an imager 11, a memory 12, an output interface 13, an input interface 14, the controller 15, a communication interface 16, and a battery 17. These functional parts are communicably connected to one another, for example, via a dedicated line.

The imager 11 includes a camera and is configured to capture an image of a user. The imager 11 may store the captured image in the memory 12 or transmit the captured image to the controller 15, for the purpose of analysis.

The memory 12 may be, but is not limited to, a semiconductor memory, a magnetic memory, or an optical memory. The memory 12 may function as, for example, a main memory, an auxiliary memory, or a cache memory. The memory 12 may store information resulting from analysis or processing performed by the controller 15. The memory 12 may also store various types of information regarding operations and control of the information processing apparatus 1. The memory 12 may include a system program, an application program, and embedded software. For example, the memory 12 of the embodiment disclosed herein stores a sightseeing information database (DB).

The output interface 13 is a physical interface. The output interface 13 includes a display interface (such as a panel display) configured to display information generated by the controller 15, information read out from the memory 12, or the like. The output interface 13 may include a speaker configured to output, by voice audio, information generated by the controller 15, information read out from the memory 12, or the like.

The input interface 14 includes one or more input interfaces that detect a user input and sends input information to the controller 15. Examples of input interfaces may include, but are not limited to, a physical key, a capacitive key, a touch screen integrally provided in the panel display, a microphone configured to receive audio input, and an IC card reader.

The controller 15 includes, for example, one or more general-purpose processors, such as a Central Processing Unit (CPU) or a Micro Processing Unit (MPU), or one or more processors that are dedicated to specific processing. The controller 15 is not limited to processors and may include one or more dedicated circuits. Examples of dedicated circuits may include a Field-Programmable Gate Array (FPGA) and an Application Specific Integrated Circuit (ASIC). When the information processing apparatus 1 is an autonomous vehicle, the controller 15 may be an Electronic Control Unit (ECU) or any in-vehicle apparatus, such as a car navigation apparatus.

The communication interface 16 includes, for connecting to the network NW, one or more communication modules that conform to wired or wireless LAN (Local Area Network) standards. Alternatively, the communication interface 16 may include one or more modules conforming to mobile communication standards, such as the 4th Generation (4G) or the 5th Generation (5G). The communication interface 16 may also include a communication module conforming to near field communications such as Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. In an example in which the information processing apparatus 1 is an autonomous vehicle, an in-vehicle communication device may function as the communication interface 16. In the disclosed embodiment, the information processing apparatus 1 is connected to the network NW via the communication interface 16. The communication interface 16 is configured to transmit and receive any information (such as position information acquired through GPS (Global Positioning System) via the network NW.

The battery 17 supplies power to each component of the information processing apparatus 1. The battery 17 may include a rechargeable secondary battery. Examples of secondary batteries may include a lithium ion battery, a nickel-cadmium battery, and a nickel-hydrogen battery. The battery 17 is not limited to a secondary battery, and may be a non-rechargeable primary battery. Examples of primary batteries may include an alkaline battery and a manganese battery.

Figure 3:
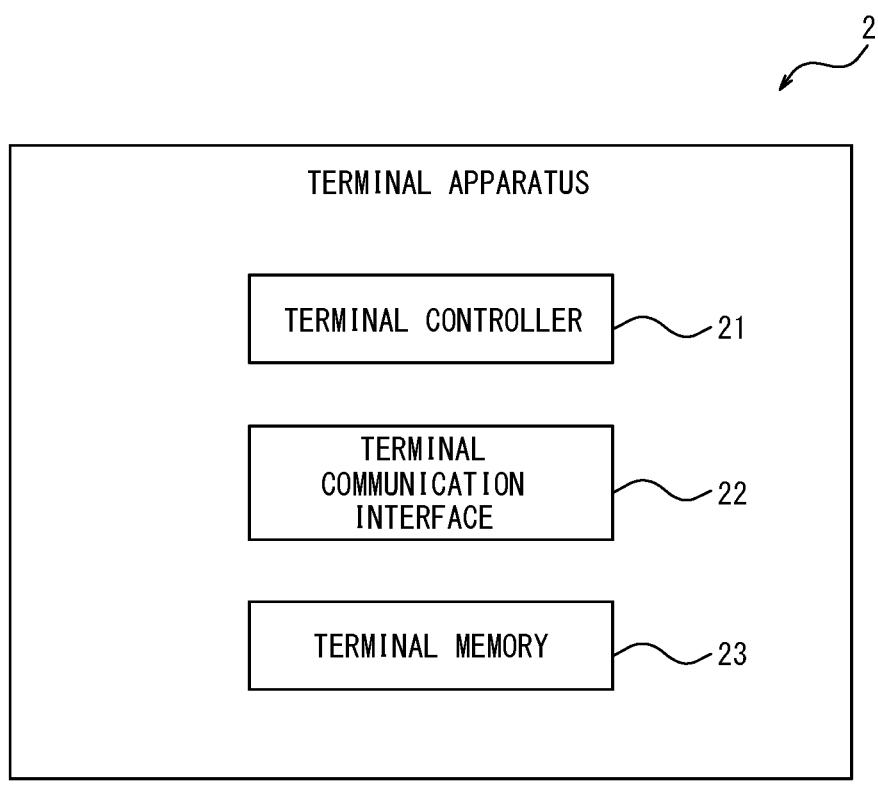
FIG. 3 is a function block diagram of a terminal apparatus.

With reference to FIG. 3, an internal configuration of the terminal apparatus 2 is described in detail.

The terminal apparatus 2 includes a terminal controller 21, a terminal communication interface 22, and a terminal memory 23. These functional parts are communicably connected to each other. The terminal apparatus 2 is in the possession of the user.

The terminal controller 21 includes, for example, one or more general-purpose processors, such as a CPU or an MPU, or one or more dedicated processors that are dedicated to specific processing. The terminal controller 21 is not limited to processors and may also include one or more dedicated circuits. Examples of dedicated circuits may include an FPGA or an ASIC.

The communication interface 16 includes, for connecting to the network NW, one or more communication modules that conform to wired or wireless LAN (Local Area Network) standards, or may include a module conforming to a mobile communication standard, such as the 4G or the 5G. The terminal communication interface 22 may also include a communication module conforming to near field communications, such as Bluetooth®, AirDrop®, IrDA, ZigBee®, Felica®, and RFID. In the disclosed embodiment, the terminal apparatus 2 is connected to the network NW via the terminal communication interface 22. The terminal communication interface 22 is configured to transmit and receive any information via the network NW.

The terminal memory 23 may be, but is not limited to, a semiconductor memory, a magnetic memory, or an optical memory. The terminal memory 23 may function as, for example, a main memory, an auxiliary memory, or a cache memory. The terminal memory 23 may store information resulting from analysis or processing performed by the terminal controller 21. The terminal memory 23 may also store various types of information regarding operations and control of the terminal apparatus 2. The terminal memory 23 may store a system program, an application program, embedded software, etc.

Figure 4:
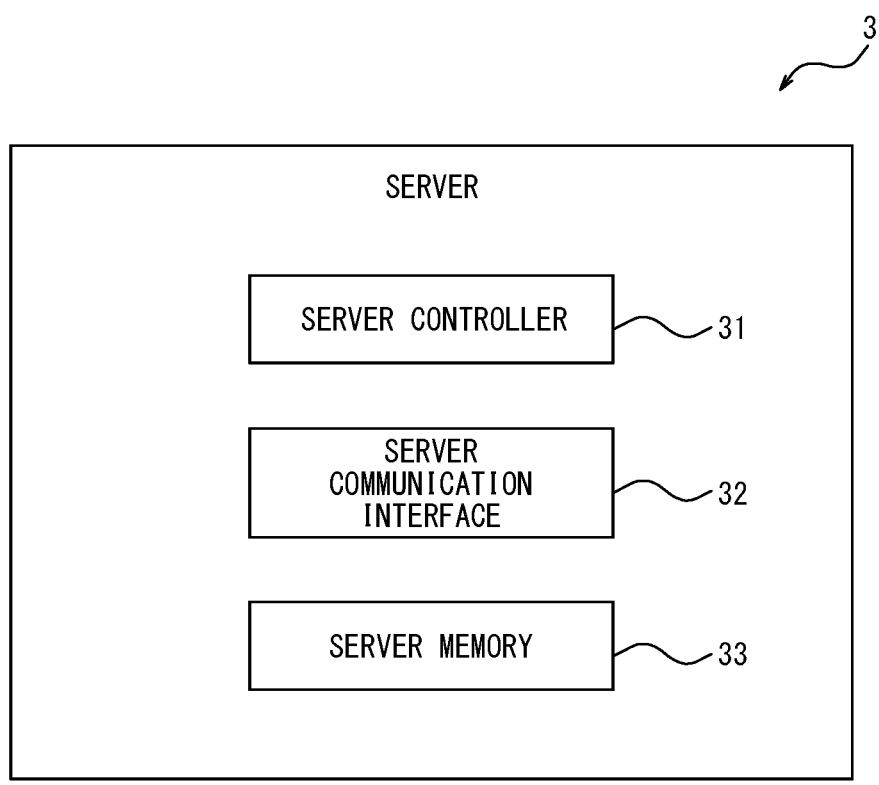
FIG. 4 is a function block diagram of a server.

With reference to FIG. 4, an internal configuration of the server 3 is described in detail. The server 3 includes a server controller 31, a server communication interface 32, and a server memory 33. These functional parts are communicably connected to each other.

The server controller 31 includes, for example, one or more general-purpose processors, such as a CPU or an MPU, or one or more dedicated processors that are dedicated to specific processing. The server controller 31 is not limited to such a processor and may also include one or more dedicated circuits. Examples of dedicated circuits may include an FPG and an ASIC.

The server communication interface 32 includes, for connecting to a network NW, one or more communication modules conforming to wired or wireless LAN standards or a module conforming to mobile communication standards, such as the 4G or the 5G. The server communication interface 32 may also include a communication module conforming to near field communications, such as Bluetooth®, AirDrop®, IrDA, ZigBee®, Felica®, and RFID. In the disclosed embodiment, the server 3 is connected to the network NW via the server communication interface 32. The server communication interface 32 is configured to transmit and receive any information via the network NW.

The server memory 33 may be, but is not limited to, a semiconductor memory, a magnetic memory, or an optical memory. The server memory 33 may function as, for example, a main memory, an auxiliary memory, or a cache memory. The server memory 33 may store information resulting from analysis or processing performed by the server controller 31. The server memory 33 may also store various types of information regarding operation and control of the server 3. The server memory 33 may include a system program, an application program, and embedded software. For example, the server memory 33 of the embodiment disclosed herein includes a schedule database (DB) storing schedule of the user. As an alternative example, the schedule DB may be included in the terminal apparatus 2.

Processing executed in the information processing system S according to the disclosed embodiment will be described in detail. The information processing apparatus 1 is configured as a drone by way of example.

The information processing apparatus 1, upon receiving a user instruction, receives position information for the terminal apparatus 2 in the possession of the user, directly from the terminal apparatus 2 or indirectly from the server 3, at predetermined time intervals. The information processing apparatus 1, upon recognizing the position of the terminal apparatus 2, moves to maintain a predetermined distance to the terminal apparatus 2. The predetermined distance is, for example 5 m. As a result, the information processing apparatus 1 follows the user.

As an alternative example, the information processing apparatus 1 receives a user instruction and activates the imager 11 to capture an image of the user, instead of acquiring position information for the terminal apparatus 2. The information processing apparatus 1 recognizes the user from the captured image. By periodically capturing an image, the information processing apparatus 1 may follow the user originally recognized.

An example in which the position information for the terminal apparatus 2 indicates coordinate information corresponding to the Kiyomizu Temple will be described below. The controller 15 acquires sightseeing information for a sightseeing spot corresponding to the position information for the terminal apparatus 2, from the sightseeing information DB. As an alternative example, the controller 15 may acquire the position information for the information processing apparatus 1 and acquire sightseeing information for a sightseeing spot corresponding to the position information for the information processing apparatus 1, from the sightseeing information DB.

As illustrated in FIG. 5, the sightseeing information DB stores sightseeing information and a digest version of the sightseeing information. Upon receiving the sightseeing information D001, the controller 15 provides the sightseeing information D001 via the output interface 13. As an alternative example, the controller 15 may provide the sightseeing information D001 via the terminal apparatus 2 of the user.

The sightseeing information includes at least one of an image and voice audio.

The schedule DB of the server memory 33 stores schedule of the user. As illustrated in FIG. 6, the schedule indicates a time and action plan associated with the time. The controller 15 acquires schedule of the user from the schedule DB. The controller 15 may generate sightseeing information according to the schedule, and provide the sightseeing information to the user via the output interface 13. For example, in the aforementioned example in which the position of the information processing apparatus 1 indicates the Kiyomizu Temple, the controller 15 determines that the current action plan is "sightseeing at the Kiyomizu Temple". According to the determination, the controller 15 determines that the next action plan is "lunch". The controller 15 may acquire, from the server 3, sightseeing information relating to lunch (for example, information on one or more restaurants in the vicinity thereof), and provide the information to the user.

The controller 15 determines a status of the user. Specifically, the controller 15 determines, from the result of an analysis of an image captured by the imager 11 or voice audio input via the input interface 14, whether the user is having a conversation or talking on the phone with another user. When the controller 15 has determined that the user is having a conversation or talking on the phone with another user, the controller 15 moves the information processing apparatus 1 away from the user by adjusting the distance from the user to the information processing apparatus 1. As an alternative example, the controller 15 may determine whether the user is eating and/or drinking, instead of determining whether the user is having a conversation or talking on the phone with another user. The controller 15 moves the information processing apparatus 1 away from the user by adjusting the distance from the user to the information processing apparatus 1 when the controller 15 determines that the user is eating and/or drinking.

The controller 15 determines a remaining charge of the battery 17 and determines whether the remaining charge is greater than a reference value. When the controller 15 determines that the remaining charge of the battery 17 is not greater than the reference value, the controller 15 refers to the sightseeing information DB to acquire a digest version of the sightseeing information from the memory 12. The controller 15 provides the digest version of the sightseeing information acquired from the memory 12, to the user via the output interface 13. On the other hand, when the controller 15 determines that the remaining charge of the battery 17 is greater than the reference value, the controller 15 provides a standard version of sightseeing information.

The controller 15 captures, using the imager 11, an image of the user during the flight of the information processing apparatus 1. The controller 15 analyzes the image captured by the imager 11, and recognizes the facial expression of the user. For the image analysis, any appropriate image analysis method, such as machine learning, may be used. The controller 15 determines whether the facial expression of the user thus recognized matches a predetermined facial expression. The predetermined facial expression may be a laughing facial expression or a surprised facial expression. When the controller 15 determines that the facial expression of the user matches one of the predetermined facial expressions, the controller 15 adjusts the position of the information processing apparatus 1 to move to a position (such as in front of the user) at which the facial expression of the user can be captured in its entirety. Having adjusted the position, the controller 15 captures, using the imager 11, another image of the user as a second image. The controller 15 may send the second image thus captured to the terminal apparatus 2 to allow the user to view the second image.

Figure 7:
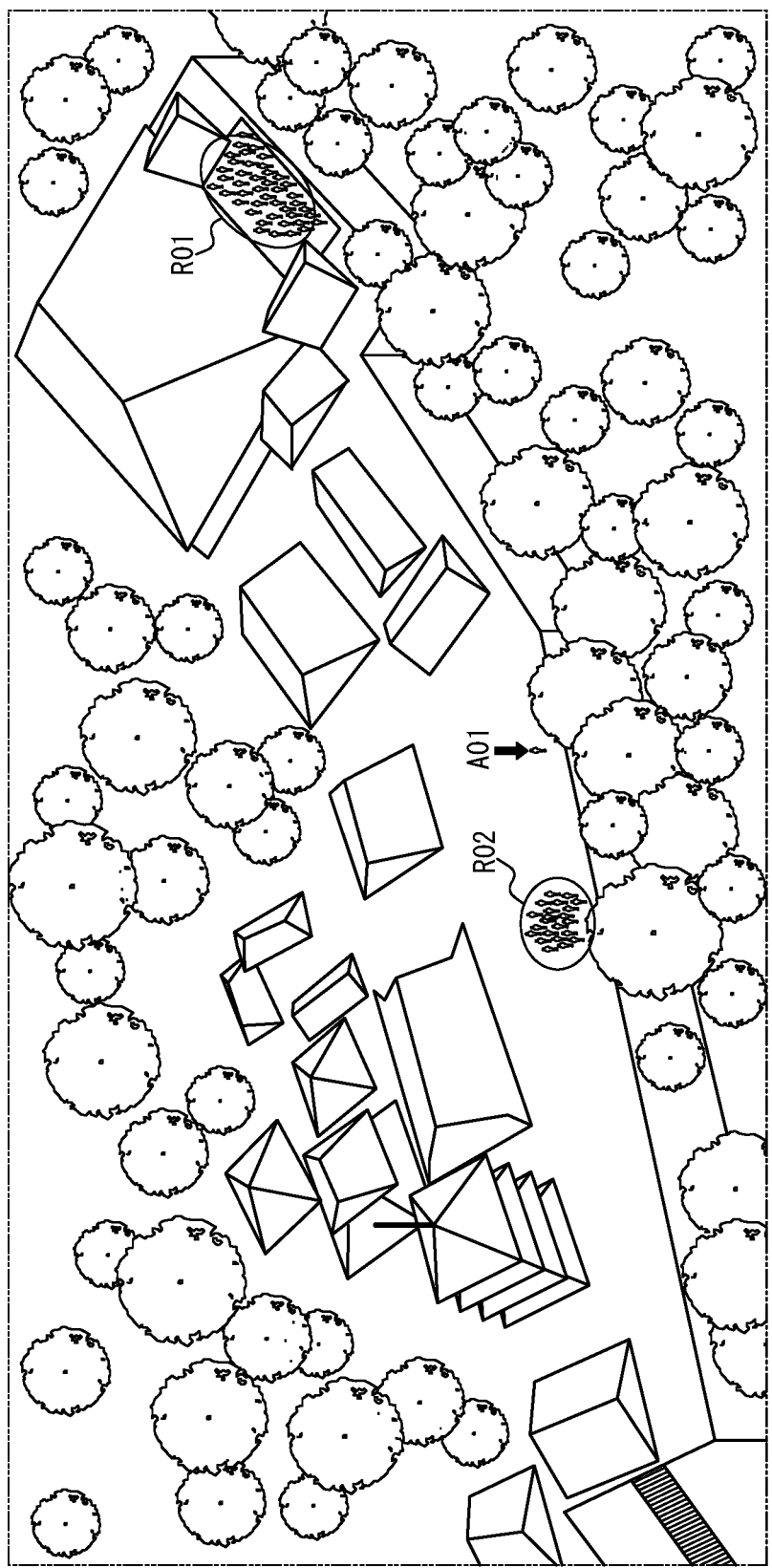
FIG. 7 illustrates a congestion map.

The controller 15, upon receiving a user instruction, moves the information processing apparatus 1 to the airspace (for example, at a height of 100 m) above the user. The controller 15 captures, using the imager 11, an image of the periphery of the user. The controller 15 analyzes the image captured by the imager 11 and determines the degree of congestion of people, and generates a congestion map of FIG. 7. The arrow A01 indicates the position of the user. According to the congestion map, points at which the degree of congestion is equal to or larger than a predetermined value are surrounded by a curved line, in the manner illustrated for range R01 and range R02. In an alternative example, the degree of congestion may be rendered as a heatmap.

The controller 15 notifies the user of the degree of congestion. Specifically, having returned to the original position from the airspace above the user, the controller 15 causes the output interface 13 to display the congestion map generated, so as to allow the user to view the map. As an alternative example, the controller 15 may notify the user, by voice audio, of the degree of congestion around the user (for example, to notify the user of the direction in which a congested point is located, relative to the user). As another alternative example, the controller 15 may cause the congestion map to be displayed on the terminal apparatus 2 or may output voice audio explaining the degree of congestion, from the terminal apparatus 2.

With reference to FIG. 8, a control method executed by the information processing apparatus 1 will be described.

In Step S1, the information processing apparatus 1 starts following the user, using the position information for the terminal apparatus 2.

In Step S2, the controller 15 of the information processing apparatus 1 acquires schedule of the user.

In Step S3, the controller 15 adjusts the position of the information processing apparatus 1 according to the status of the user.

In Step S4, the controller 15 determines whether the remaining charge of the battery 17 is larger than the reference value.

When Yes in Step S4, the controller 15 provides, in Step S5, sightseeing information according to the sightseeing spot and the schedule, to the user.

On the other hand, when No in Step S4, the controller 15 provides, in Step S6, a digest version of the sightseeing information to the user.

In Step S7, the controller 15 captures an image of a facial expression of the user.

In Step S8, the controller 15 analyzes the image captured, and determines whether the facial expression of the user matches a predetermined facial expression.

When Yes in Step S8, the controller 15 adjusts, in Step S9, the position of the information processing apparatus 1, and captures another image of the user in Step S10.

In Step S11, the controller 15 captures an image of the circumference of the user from the airspace above the user.

In Step S12, the controller 15 determines the degree of congestion around the user, from the image, and notifies the user of the degree of congestion.

As described above, according to the disclosed embodiment, the information processing apparatus 1 follows the user. The controller 15 of the information processing apparatus 1 acquires position information, and provides the user with sightseeing information according to the sightseeing spot determined from the position information. This configuration allows the information processing apparatus 1 to provide unmanned guidance suited to the user who is travelling. Thus, the information processing apparatus 1 can increase the user's satisfaction with respect to travel.

According to the disclosed embodiment, the controller 15 acquires schedule of the user and provides sightseeing information according to the schedule. This configuration enables the controller 15 to provide, to the user, sightseeing information more suited to the user.

Further, according to the disclosed embodiment, the controller 15 adjusts the distance from the user to the information processing apparatus 1, according to the status of the user. This configuration enables the information processing apparatus 1 to be moved away from the user when, for example, the user is having a conversation or talking on the phone with another user, or eating and/or drinking. This configuration reduces the risk that the user is disturbed by the operating noise of the information processing apparatus 1.

Further, according to the disclosed embodiment, the information processing apparatus 1 includes the imager 11. The controller 15 recognizes the facial expression of the user based on the image captured by the imager 11. When the controller 15 determines that the facial expression matches a predetermined facial expression, the controller 15 adjusts the position of the information processing apparatus 1 to capture another image of the user. This configuration allows the controller 15 to capture an image of the user with a favorable facial expression during travel and keep it as a record.

Further, according to the disclosed embodiment, the information processing apparatus 1 includes the battery 17. The controller 15 adjusts the contents of the sightseeing information to be provided, depending on the remaining charge of the battery 17. This configuration enables the controller 15 to provide a digest version of the sightseeing information when the remaining charge of the battery 17 is running low. This configuration enables the risk of exhausting the battery 17 to be reduced.

Further, according to the disclosed embodiment, the information processing apparatus 1 is capable of flying, and includes the imager 11. The controller 15 uses the imager 11 to capture an image from the air, determines the degree of congestion around the user based on the image captured, and notifies the user of the degree of congestion. This configuration enables the controller 15 to notify the user of the degree of congestion, thereby supporting the user to continue sightseeing without running into congested areas.

While the present disclosure has been described based on the drawings and examples, it should be noted that various changes and modifications may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined together or divided.

For example, in the aforementioned embodiment, the entirety or a subset of the functions or processing described as those of the information processing apparatus 1, the terminal apparatus 2, or the server 3 may be realized as the functions or processing of a general-purpose information processing apparatus, such as a smartphone or a computer. Specifically, a program describing processing content for realizing the functions of the information processing apparatus 1, the terminal apparatus 2, or the server 3 according to the embodiments may be stored in a memory of such an information processing apparatus, and the program may be read and executed by a processor of the information processing apparatus. Thus, the present disclosure may also be implemented as a program that may be executed by a processor.

The invention claimed is:

1. An information processing apparatus comprising a controller and being capable of following a user, wherein the controller is configured to:
   acquire position information; and
   provide, to the user, sightseeing information according to a sightseeing spot determined from the position information, wherein the controller is configured to change a distance from the user to the information processing apparatus, according to a status of the user, such that the controller is configured to move the information processing apparatus away from the user upon determining that the user is having a conversation, talking on a phone, eating, and/or drinking.

2. The information processing apparatus according to claim 1, wherein the controller is configured to acquire schedule of the user, and provide the sightseeing information according further to the schedule.

3. The information processing apparatus according to claim 1, further comprising an imager,
wherein the controller is further configured to:
recognize, based on an image captured by the imager, a facial expression of the user;
adjust the position of the information processing apparatus and capture another image of the user, using the imager, when the facial expression is determined to be a predetermined facial expression.

4. The information processing apparatus according to claim 3, wherein the predetermined facial expression includes a laughing facial expression or a surprised facial expression.

5. The information processing apparatus according to claim 1, wherein
the information processing apparatus is capable of flying and further includes an imager, and
the controller is configured to:
capture an image from the air, using the imager;
use the image to determine a degree of congestion around the user; and
notify the degree of congestion to the user.

6. The information processing apparatus according to claim 1, further comprising a battery,
wherein the controller is configured to adjust the content of sightseeing information to be provided, according to a remaining charge of the battery.

7. A non-transitory computer readable medium storing a program configured to cause a computer as an information processing apparatus capable of following a user, to execute operations, the operations comprising:
acquiring position information;
providing sightseeing information according to a sightseeing spot determined from the position information, and
change a distance from the user to the information processing apparatus, according to a status of the user, such that the information processing apparatus is programmed to move away from the user upon determining that the user is having a conversation, talking on a phone, eating, and/or drinking.

8. The non-transitory computer readable medium according to claim 7, wherein the providing includes acquiring schedule of the user and providing the sightseeing information according further to the schedule.

9. The non-transitory computer readable medium according to claim 7, wherein the information processing apparatus includes an imager,
the operations further comprising:
capturing an image using the imager;
recognizing a facial expression of the user, from the image; and
adjusting the position of the information processing apparatus and capturing another image of the user, using the imager, when the facial expression is determined to be a predetermined facial expression.

10. The non-transitory computer readable medium according to claim 9, wherein the predetermined facial expression includes a laughing facial expression or a surprised facial expression.

11. A control method performed by an information processing apparatus capable of following a user, the control method comprising:
acquiring position information; and
providing, to the user, sightseeing information according to a sightseeing spot determined from the position information,
wherein the controller is configured to change a distance from the user to the information processing apparatus, according to a status of the user, such that the controller is configured to move the information processing apparatus away from the user upon determining that the user is having a conversation, talking on a phone, eating, and/or drinking.

12. The control method according to claim 11, wherein the providing includes:
acquiring schedule of the user and providing the sightseeing information to the user based further on the schedule.

13. The control method according to claim 11, wherein the information processing apparatus includes an imager,
the method further comprising:
recognizing a facial expression of the user from the image captured by the imager; and
adjusting the position of the information processing apparatus and capturing another image of the user, using the imager, when the facial expression is determined as a predetermined facial expression.

14. The control method according to claim 13, wherein the predetermined facial expression includes a laughing facial expression or a surprised facial expression.

* * * * *